UNITED STATES PATENT OFFICE.

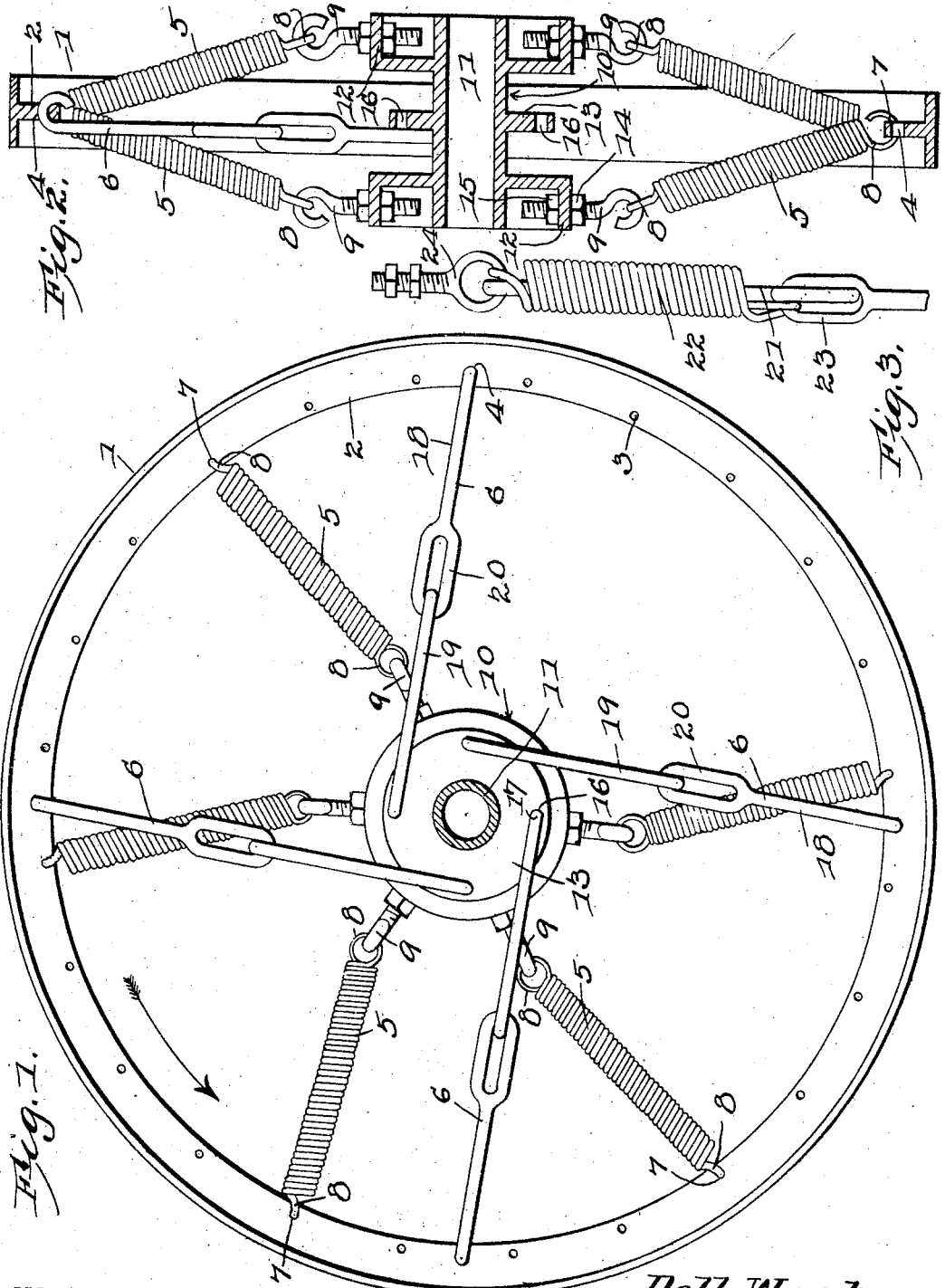

DELL WARD, OF GRAND RAPIDS, MICHIGAN, ASSIGNOR OF ONE-HALF TO HERBERT G. REYNOLDS, OF GRAND RAPIDS, MICHIGAN.

VEHICLE-WHEEL.

No. 837,987.  Specification of Letters Patent.  Patented Dec. 11, 1906.

Application filed December 4, 1905. Serial No. 290,254.

*To all whom it may concern:*

Be it known that I, DELL WARD, a citizen of the United States, residing at Grand Rapids, in the county of Kent and State of Michigan, have invented a new and useful Vehicle-Wheel, of which the following is a specification.

This invention relates generally to vehicle-wheels, and more particularly to one adapted for use upon automobiles and other motor-driven machines.

The object of the invention is in a ready, practical, and novel manner to secure the desired cushioning effect of the wheel without the employment of pneumatic or cushion tires for the purpose.

With the above and other objects in view, as will appear as the nature of the invention is better understood, the same consists, generally stated, in a wheel having a hub yieldably combined with the rim and means for causing the hub always to be centered relatively to the rim.

The invention consists, further, in the various novel details of construction of a spring-wheel for vehicles, as will be hereinafter fully described and claimed.

In the accompanying drawings, forming a part of this specification, and in which like characters of reference indicate corresponding parts, Figure 1 is a view in elevation, partly in section, of a vehicle-wheel constructed in accordance with the present invention. Fig. 2 is a vertical transverse section through the wheel. Fig. 3 is a detail view of a slightly-modified form of spoke.

Referring to the drawings, 1 designates the rim of the wheel, which, as shown in Fig. 2, is T-shaped in cross-section and is constructed of any preferred metal. The web 2 of the rim is provided with two series of spaced orifices 3 and 4, the former of which are engaged by the outer terminals of the spokes 5 and the latter by the outer terminals of hub-locking arms 6. Each spoke, as clearly shown in Fig. 1, is constructed of a length of coiled spring, the terminal whirls of which are formed into eyes or loops 7 and 8, the former of which engages with an orifice 3 and the latter with an eyebolt 9, carried by the hub, (designated generally 10.) The hub comprises an axle-box 11, two terminal cupped flanges 12, and an intermediate disk or flange 13, all of these parts by preference being integral, although this is not essential, as they may be made as separate elements and suitably assembled. Each of the eyebolts 9, of which there will be one for each spoke, has a threaded shank upon which are mounted two nuts 14 and 15, the former of which bears upon the exterior surface of the flange and the latter upon the interior surface thereof. By properly manipulating the two nuts the spokes may be placed under requisite tension and also the hub may be accurately centered relatively to the rim and be locked in such adjustment, as will be readily understood by reference to Fig. 2. By the provision of the cupped flanges 12 the inner ends of the eyebolts and the nuts 15 are thrown within the plane of the outer ends of the hub and are thus shielded from liability of being damaged by contacting with protruding objects.

The flange 13 is provided with spaced orifices 16, that are engaged by the inner ends 17 of the hub-locking arms 6, of which four are shown in this instance, each consisting of two members 18 and 19, connected between their ends by a link-joint 20. These hub-locking arms are necessary in order to prevent the hub from yielding where the wheel is driven from the axle, as it will be seen under such conditions without any means for locking the hub that the initial movement of the axle will cause the upper series of springs to be flexed and the lower series be compressed, and thereby cause the hub to occupy a position eccentric to the rim, which would result in a loss of power. By the employment of the locking arms or members when the power is first applied to the axle they will take up the torsional strain and cause the driving of the wheel to be positive, and by reason of the link connection between their members they will yield, thus to allow the spring-spokes 5 to perform their function of cushioning the wheels.

In the form of the invention shown in Fig. 3 the locking-arm 21, which is of the same construction as that already described, passes through the coils of the spoke 22, the latter having one of its terminal whirls hooked into engagement with the member 23 of the locking-arm and the other whirl in engagement with a screw-eye 24, to which the terminal locking-arm is also secured, the screw-eye to be assembled with the flange 12 in a manner already described.

Of course it will be understood that the improvements herein described are capable of use in connection with a wheel-rim having a cushion or other tire, and as this will be readily understood detailed illustration thereof is omitted.

From the foregoing description it will be seen that by the arrangements employed cushioning of the wheel is effected in a positive manner and that truing of the hub relatively to the rim may readily be accomplished with the expenditure of a minimum of labor.

I claim—

1. A wheel comprising a rim, a hub, spring-spokes connecting the rim and the hub, and hub-locking arms connecting the hub and the rim each comprising two members loosely connected together by elongated eyes.

2. A wheel comprising a rim, a hub, adjustable spring-spokes connecting the hub and the rim, and means for preventing the rotation of the hub independently of the rim in one direction, said means comprising members disposed with their axes parallel and connected together at adjacent ends and to the rim and hub at opposite ends.

3. A wheel comprising a rim, a hub, a plurality of spring-spokes attached at their ends to the hub and rim and extending outwardly from the hub in an approximately radial position, and means for transmitting power between the hub and rim, said means comprising a plurality of pairs of members, the members of each pair being movably connected end to end with their axes alining and pivotally attached directly to the rim and hub.

4. A wheel comprising a hub provided with terminal and intermediate flanges, adjustable screw-eyes carried by the terminal flanges, spring-spokes connected with the screw-eyes and with the rim, and hub-locking arms connecting the rim and the intermediate flange.

5. A wheel comprising a rim, a hub, a plurality of extension-springs connected at their ends with the hub and rim and disposed in an approximately radial position around the hub, and means for transmitting motion between the hub and rim, said means comprising a plurality of pairs of members, the members of each pair being arranged with their axes alining and loosely united to have longitudinal movement and connected with the hub and rim in tangential relation to the former and approximately radial relation to the latter.

6. A wheel comprising a hub having terminal cupped flanges and an intermediate disk flange, adjustable screw-eyes carried by the cupped flanges, a rim, spring-spokes connected with the rim and with the screw-eyes, and longitudinally-yieldable hub-locking arms connected with the rim and with the intermediate flange.

In testimony that I claim the foregoing as my own I have hereto affixed my signature in the presence of two witnesses.

DELL WARD.

Witnesses:
CARL F. MEYER,
FRED L. SLOGHT.